United States Patent [19]
Blomgren et al.

[11] Patent Number: 5,781,750
[45] Date of Patent: Jul. 14, 1998

[54] DUAL-INSTRUCTION-SET ARCHITECTURE CPU WITH HIDDEN SOFTWARE EMULATION MODE

[75] Inventors: James S. Blomgren; David E. Richter, both of San Jose, Calif.

[73] Assignee: Exponential Technology, Inc., San Jose, Calif.

[21] Appl. No.: 179,926

[22] Filed: Jan. 11, 1994

[51] Int. Cl.[6] ........................................... G06F 9/455
[52] U.S. Cl. .................... 395/385; 395/500; 395/570
[58] Field of Search ........................ 395/385, 500, 395/800.43, 570, 800.23, 800.41

[56] References Cited

U.S. PATENT DOCUMENTS

| | | | |
|---|---|---|---|
| 3,764,988 | 10/1973 | Onishi | 395/581 |
| 4,377,844 | 3/1983 | Kaufman | 711/220 |
| 4,456,954 | 6/1984 | Bullions, III et al. | 711/207 |
| 4,514,803 | 4/1985 | Agnew et al. | 395/500 |
| 4,538,241 | 8/1985 | Levin et al. | 711/207 |
| 4,633,417 | 12/1986 | Wilburn et al. | 364/550 |
| 4,691,278 | 9/1987 | Iwata | 395/500 |
| 4,763,242 | 8/1988 | Lee et al. | 395/500 |
| 4,780,819 | 10/1988 | Kashiwagi | 395/500 |
| 4,794,522 | 12/1988 | Simpson | 395/500 |
| 4,812,975 | 3/1989 | Adachi et al. | 395/500 |
| 4,821,187 | 4/1989 | Ueda et al. | 395/596 |
| 4,841,476 | 6/1989 | Mitchell et al. | 395/500 |
| 4,942,519 | 7/1990 | Nakayama | 395/290 |
| 4,972,317 | 11/1990 | Buonomo et al. | 395/568 |
| 4,991,081 | 2/1991 | Boshart | 711/3 |
| 4,992,934 | 2/1991 | Portanova et al. | 395/385 |
| 5,077,654 | 12/1991 | Ohtsuki | 711/203 |
| 5,077,657 | 12/1991 | Cooper et al. | 395/500 |
| 5,097,407 | 3/1992 | Hino et al. | 395/385 |
| 5,136,696 | 8/1992 | Beckwith et al. | 395/587 |
| 5,167,023 | 11/1992 | de Nicolas et al. | 395/527 |
| 5,210,832 | 5/1993 | Maier et al. | 395/568 |
| 5,222,223 | 6/1993 | Webb, Jr. et al. | 711/140 |
| 5,226,164 | 7/1993 | Nadas et al. | 395/385 |
| 5,230,045 | 7/1993 | Sindhu | 711/203 |
| 5,230,069 | 7/1993 | Brelsford et al. | 711/6 |
| 5,255,384 | 10/1993 | Sachs et al. | 711/207 |
| 5,291,586 | 3/1994 | Jen et al. | 395/500 |

OTHER PUBLICATIONS

"High Performance Dual Architecture Processor", IBM Technical Disclosure Bulletin, vol. 36, No. 2, Feb. 1993, pp. 231–234.

Tanenbaum, "Structured Computer Organization", Prentice-Hall 1984, pp. 10–12.

Combining both micro–code and Hardwired control in RISC by Bandyophyay and Zheng., Sep. 1987 Computer Architecture News pp. 11–15.

Combining RISC and CISC in PC systems By Garth, Nov. 1991 IEEE publication (?) pp. 10/1 to 10/5.

*Primary Examiner*—Parshotam S. Lall
*Assistant Examiner*—Viet Vu
*Attorney, Agent, or Firm*—Stuart T. Auvinen

[57] ABSTRACT

A dual-instruction-set CPU is able to execute x86 CISC (complex instruction set computer) code or PowerPC RISC (reduced instruction set computer) code. Three modes of operation are provided: CISC mode, RISC mode, both called user modes, and emulation mode. Emulation mode is entered upon reset, and performs various system checks and memory allocation. A special emulation driver is loaded into a portion of main memory set aside at reset. Software routines to emulate the more complex instructions of the CISC architecture using RISC instructions are also loaded into the emulation memory. A TLB is enabled, and translation tables and drivers are set up in the emulation memory. All TLB misses, even in the user modes, will cause entry to a translator driver in emulation mode. Since the TLB is always enabled for the user modes, and all misses are handled by the emulation code, the emulation code can set aside a portion of memory for itself and insure that the user programs never have access to the emulation memory. Thus the programs, including operating systems, in CISC or RISC mode are unaware of emulation memory or even the existence of emulation mode.

20 Claims, 3 Drawing Sheets

DUAL-INSTRUCTION-SET ARCHITECTURE CPU WITH HIDDEN SOFTWARE EMULATION MODE

RELATED APPLICATIONS

This application is related to co-pending application for a "Pipeline with Temporal Re-arrangement of Functional Units for Dual-Instruction-Set CPU", filed Jan. 11, 1994, U.S. application Ser. No. 08/180,023, now U.S. Pat. No. 5,542,059. This application is further related to copending application for "Emulating Operating System Calls in an Alternate Instruction Set Using a Modified Code Segment Descriptor", filed Jul. 20, 1994, U.S. application Ser. No. 08/277,905, now U.S. Pat. No. 5,481,684. This application is further related to copending application for "Shared Register Architecture for a Dual-Instruction-Set CPU"", filed Jul. 20, 1994, U.S. application Ser. No. 08/277,962, now U.S. Pat. No. 5,481,693. These related applications have a common inventor and are assigned to the same assignee as the present application.

1. Field of the Invention

This invention relates to Computer System Architectures, and more particularly to microprocessors that can execute multiple instruction sets.

2. Description of the Related Art

Personal Computers (PC's) are based on two types of Central Processing Units (CPU's), categorized by the complexity of the set of instructions that may be executed on a particular CPU: CISC - complex instruction set computer, and RISC - reduced instruction set computer. CISC systems, which feature many different instructions and options for each instruction, were most popular in the 1970's. The design philosophy was that by making the instructions complex, each instruction could carry out more actual computational 'work', thus a fewer number of instructions would be needed. This is analogous to breaking a task down into a few large steps.

RISC became a viable alternative as smaller microprocessors became inexpensive and thus popular. It was not easy to provide on a single silicon die all the hardware needed to execute the relatively complex instructions of a CISC processor. Since the CISC hardware had to execute many different types of instructions, all within the same fixed clock period, the clock had to be slowed down to accommodate the slower, more complex instructions. It was also discovered that the simpler instructions were often more likely to be used than the complex instructions, and that some complex instructions were infrequently used. Thus the idea of RISC was born - using a smaller, reduced set of instructions. Although more instructions, or steps, would be needed, the hardware could be made simpler and the clock would not have to be slowed down by the infrequent complex instructions.

Early microprocessors were of the CISC variety. International Business Machines (IBM) of Armonk, N.Y. chose the 8088 microprocessor from Intel Corp. of Santa Clara, Calif. for its line of personal computers or PC's. Many other vendors made their own PC's based on later members of the 8088's family of CPU's, the 'x86' family, named after the 8086, a forerunner to the 8088 CPU. Since IBM provided a standard, PC's based on the x86 family proliferated. Each newer member of the x86 family could run instructions, or code, from the earlier x86 CPU's. As more and more programs were written for PC's, including the DOS and Windows operating systems by Microsoft Corp. of Redmond, WA., x86 became the most popular instruction set, or architecture. About 37 million x86 CPU's will be shipped during 1993.

Figure 1:
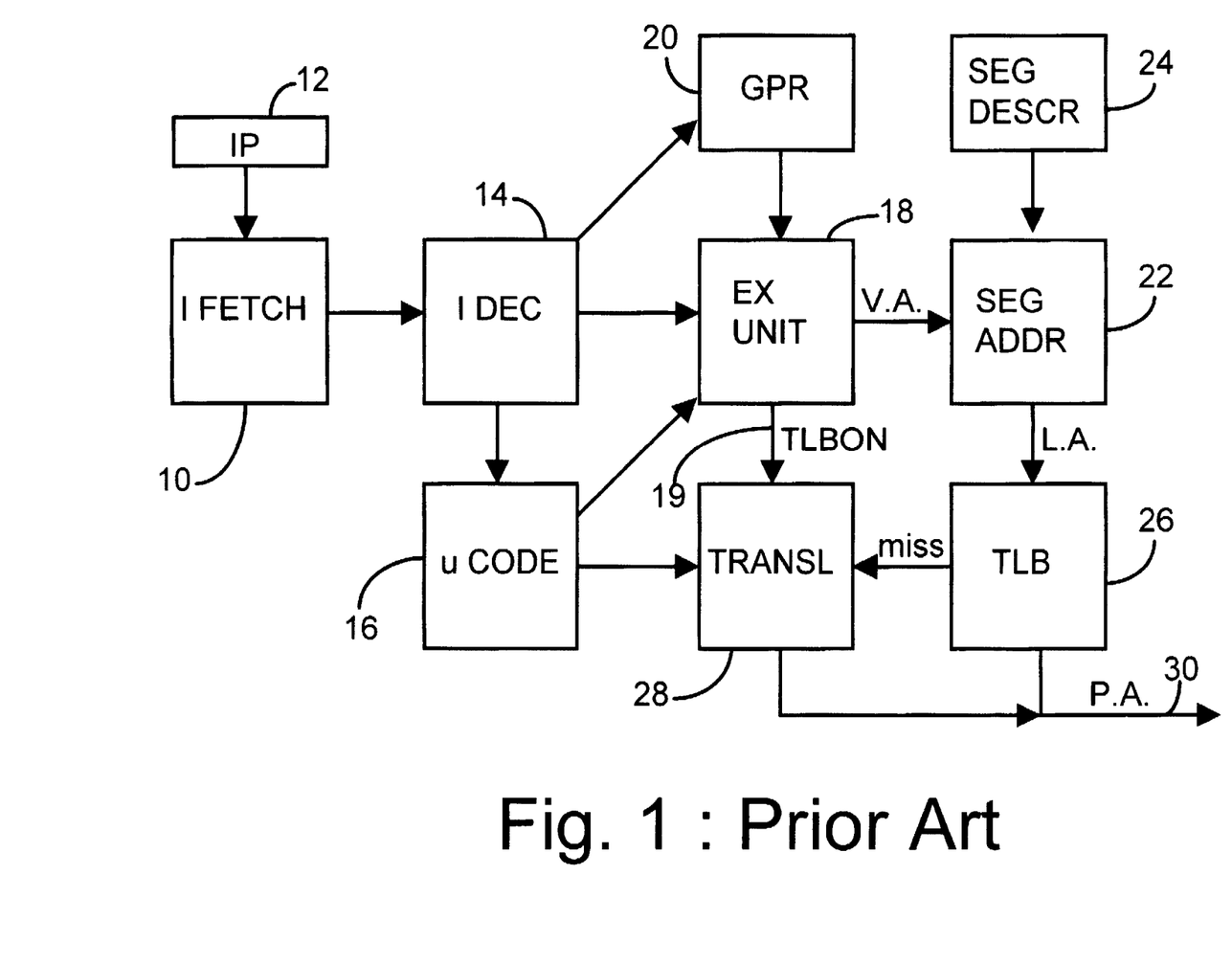
FIG. 1 is a simplified block diagram of a prior-art x86 CPU.

FIG. 1 is a simplified block diagram of an x86 CISC microprocessor, such as the 80386. Instructions flow through a processor in a "pipeline" fashion, possibly with several instructions being in the pipeline at the same time, each instruction at a different functional block or "pip-estage". An instruction is fetched from memory and placed into Instruction Fetcher 10, which may have a buffer which can hold several instructions. Instruction Pointer 12 contains the address of the particular instruction to be decoded next by Instruction Decode Unit 14. Instruction Decode 14 interprets the instruction, and identifies which operands need to be accessed from the high-speed general-purpose Register file (GPR) 20. Instruction decode 14 sends the opcode field of the instruction to microcode ROM 16, and the opcode field is used to enter the microcode where a routine to execute the instruction is located.

Microcode words are typically 50–200 bits wide, with various bits used to control registers, paths, and gating within the CPU, and a field indicating the location of the next microcode word to be accessed. Thus the microcode controls the CPU at the lowest hardware level; the bits in the microcode word are able to control individual logic gates and latches inside the CPU die. Long, complex microcode routines can be painstakingly constructed including jumps and micro-routine calls. Typically one micro-instruction is fetched for each processor clock. Some instructions may require several micro-words.

Execute unit 18 receives a portion of the microcode word and the operands from GPR 20, and can perform simple arithmetic operations with an ALU, or generate an address for a branch, load, or store. If an address is generated, it is passed to segment unit 22, which for the x86 architecture performs a full 32-bit addition, adding a segment base address stored in segment descriptor registers 24, to the virtual address generated by the execute unit, the result being called the linear address. The linear address is checked to see if it is outside the segment boundaries, indicating a limit violation. The linear address is passed along to the Translation-Lookaside Buffer (TLB) 26, which is a small associative memory. If an entry is found in the TLB corresponding to the linear address, the translated or physical address is read out of the TLB and output to the main memory on address bus 30. If no entry corresponding to the linear address is found in the TLB, then a miss is signaled to translator 28. Translator 28 may need to access a routine in microcode ROM 16, or the translator may be controlled by a state machine. Translator 28 forms an address for the page tables stored in inexpensive main memory, and accesses the page table entry corresponding to the linear address, and then loads this entry into the TLB. In the x86 architecture, a two-level page table is used, requiring the translator to access main memory twice, first fetching an entry from a page directory table, and then the page table entry. Page tables are data structures in main memory that contain translation information, such as the physical page address and access information.

The user may execute an instruction to enable or disable the TLB and any translation. Such an instruction will cause execute unit 18 to enable or disable translation by activating line 19. Line 19 is thus an enable/disable line for translation and the TLB. The same feature may also be supported by writing a TLB enable bit in a control register within the CPU, and then having the control register drive TLB enable line 19.

Another popular CISC microprocessor is the 68000 family from Motorola of Scottsdale, Ariz. This CPU is used in the Macintosh Computer manufactured by Apple Computer of Cupertino, Calif. Apple will ship about 2 million units in 1993.

Apple and IBM have announced their intention to switch to RISC for future CPU's. The PowerPC microprocessor will be manufactured by IBM and Motorola, and will feature a simplified or reduced instruction set. Although RISC CPU's are manufactured by several other manufacturers, the PowerPC architecture will probably dominate because of the backing by the two largest PC manufacturers.

Because of the huge amount of software written for the x86 instruction set, software programs called "emulators" have been written that allow x86 code to be run on RISC CPU's. The emulator must parse the x86 code and convert the x86 instructions into RISC code. This can be done before the x86 code is executed, which is known as binary translation because the x86 code is translated at a low or binary level and translated to the RISC instruction set. This is an undesirable method since binary translation requires 5 to 10 times as long to run as a native x86 program. A native program is one that is written in the lowest-level machine instructions for that architecture.

Another option called interpretation is to re-compile as the x86 program is executing. Thus a second copy of the code does not have to be stored. However, the re-compiling requires extra steps by the RISC CPU and can significantly slow down the x86 code being executed, because re-compilation must occur at the same time as execution.

One such software emulation program is sold by Insignia Solutions under the name of SoftPC. This program interprets the x86 code as it is executing. However, the speed of execution, or performance, is less than that for a program written in native RISC code.

Since there is so much installed x86 code, it is greatly desired to run x86 programs on newer RISC CPU's, but without the performance degradation of the software emulator. One approach would be to add support in hardware for all the x86 instructions. While this would provide the highest performance, the complexity would be enormous, and the cost very high. A very large microcode, composed of small sub-instructions or micro-instructions, could be constructed to allow execution of all x86 instructions. This would require a large microcode read-only memory (ROM) on the CPU die. Various subroutines in the microcode would control execution of the different instructions. While it would be a tremendous competitive advantage to be able to run native x86 code on a RISC CPU, no manufacturer has yet been able to achieve this, attesting to the great technical difficulty of integrating the entire x86 instruction set.

Since PowerPC may become the next standard architecture, yet the existing software base of x86 code is immense, what is desired is a CPU that can execute both PowerPC RISC code and x86 CISC code, but without the performance degradation of emulating all x86 instructions in software.

SUMMARY OF THE INVENTION

A CPU for processing instructions from two separate instruction sets has a first instruction decode means for decoding instructions from a first instruction set and a second instruction decode means for decoding instructions from a second instruction set. The second instruction set has an encoding of instructions which is independent from the encoding of instructions of the first instruction set. A select means, coupled to the first instruction decode means and the second instruction decode means, is used for selecting the decoded instruction from either the first instruction decode means or from the second instruction decode means. An execution unit is also included for executing decoded instructions that are selected by the select means. Thus instructions from both the first instruction set and the second instruction set are executed by the CPU.

In another aspect of the invention, a mode register indicates whether the first or the second instruction set is currently being processed. The mode register is coupled to the select means so as to select decoded instructions from the proper instruction set.

In a still further aspect of the invention, only a portion of the second instruction set is decoded. If an undecoded instruction is signaled, then the mode register is switched to the first instruction set. A translation-lookaside buffer (TLB) is provided that signals to the mode register to change to the first instruction set when no translation is found. A handler routine composed of instructions from the first instructions set is executed whenever an undecoded instruction or a TLB miss is signaled.

This invention has the advantage that a complex second instruction set need not be fully decoded and supported in the CPU's hardware. The undecoded instructions are emulated by a software routine written in the reduced instruction set computer (RISC) first instruction set. Another advantage of the invention is that the TLB can be controlled by RISC mode, which can prevent second instruction set programs from directly accessing the TLB because all TLB misses cause a switch to the first instruction set routines. Thus RISC mode can set aside a memory space for the emulation routines that the second instruction set programs cannot access or even detect.

Another aspect of this invention is a method for processing instructions from a complex instruction set computer CISC instruction set on a reduced instruction set computer RISC CPU. The method includes attempting to decode an instruction with a CISC instruction decode unit that does not decode all instructions in the CISC instruction set, directly executing the instruction in an execute unit if the CISC instruction decode unit is able to decode the instruction.

An emulation mode is entered if the CISC instruction decode unit is not able to fully decode the instruction, which indicates that the execute unit cannot directly execute the instruction. The CISC instruction decode unit is disabled while a RISC instruction decode unit is enabled when entering emulation mode. An instruction pointer is loaded with an address of a software emulation routine for emulating the undecodable instruction. The routine comprises instructions from a separate RISC instruction set which are decoded with the RISC instruction decode unit as the software routine is executed and executed in the execute unit. Emulation mode is finally exited, disabling the RISC instruction decode unit and enabling the CISC instruction decode unit when the end of the software emulation routine is reached.

All instructions from the CISC instruction set can be executed, either directly by the execute unit or by emulation with a software emulation routine composed of RISC instructions.

DETAILED DESCRIPTION

This improvement relates to a central processing unit (CPU) with a pipeline for a dual-instruction set architecture. While the detailed description describes the invention in the context of a reduced instruction set computer (RISC) and a complex instruction set computer (CISC), it is contemplated that the invention applies to other instruction sets besides RISC and CISC, and to more than two instruction sets, without departing from the spirit of the invention.

When trying to implement both a RISC and a CISC architecture on the same CPU, a software emulator suffers from poor performance, while a hardware-only approach is too complex and expensive. An approach that uses some hardware and some software is the best, because simple, fast instructions can be implemented by hardware on the CPU, while complex instructions can be detected by the hardware and trapped to a software emulation driver. Thus some of the complexity of the CISC architecture is moved to the software driver. However, the emulation driver must be isolated and hidden from the user's code being executed, otherwise the user programs could modify or destroy the emulation code, resulting in a system crash.

Hiding the emulation driver from the user code is accomplished by means of a TLB that is always enabled for the user modes but is only modifiable by a special emulation mode. Since the emulation mode has complete control over the TLB, the emulation driver can use address translation to hide itself from the lower-privilege user modes. Thus an additional software layer has been inserted between the actual hardware and the user-mode operating system.

There are three operating modes of the CPU. Two modes are traditional user modes, one for RISC and another for CISC. In the user modes all instructions in the instruction set may be executed by the user programs, and protection mechanisms available in these instruction-set architectures are available within these user modes. For example, x86 instructions for enabling paging and segmentation address translation and protection exist in CISC mode, and any memory management available in the PowerPC instruction set is available in RISC mode. However, segmentation and paging control and other complex instructions are not supported directly by the CPU's hardware. Instead, when a user-mode program attempts to execute a complex instruction, a third mode, emulation mode, is entered, without detection by the user program.

Emulation Mode

Emulation mode runs a super-set of the RISC instruction set. Additional "extended" instructions are added for controlling the CPU's hardware, such as direct access to the TLB, register files, cache, and selecting between the three operating modes of the CPU. Emulation mode executes routines that emulate the behavior of the complex instructions that are not supported directly by the hardware. For example, CISC code includes a repeated string move instruction, REP MOVS. Execution of this instruction in CISC mode will cause emulation mode to be entered. A software routine will be executed that breaks the complex CISC instruction down into several smaller RISC instructions, such as Loads and Stores. The data string will be loaded into the CPU and stored back into memory repeatedly until the entire string has been moved. Then the emulation code will return control to CISC mode and the user program will continue with the next instruction, unaware that the instruction was not executed directly by hardware as an atomic instruction, but by emulation mode.

Since the instruction to change the operating mode of the CPU is available only to the emulation code, the user modes cannot directly execute the highest-level emulation instructions. Emulation mode instructions are thus hidden from user-mode programs. The emulation driver code is also hidden from the user programs because it resides in an area of memory that is not accessible by the user programs. Hiding the emulation memory area is accomplished by causing a jump into emulation mode if the user mode attempts to access the emulation memory. Emulation code can then re-direct the memory access to another portion of memory by loading the TLB with a translation, even if the TLB is not enabled by the user mode.

CPU Hardware

Figure 2:
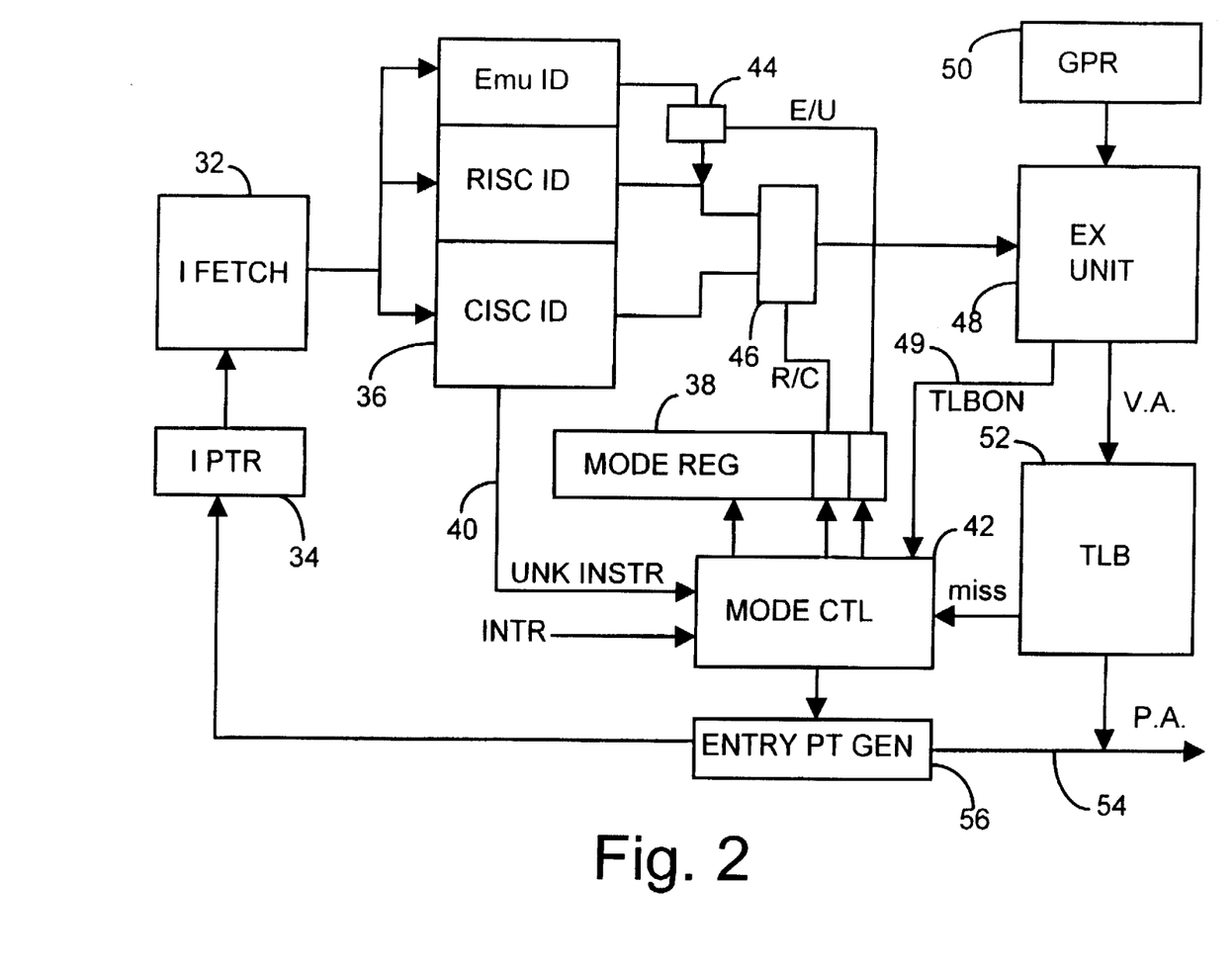
FIG. 2 is a block diagram of a dual-instruction-set CPU.

FIG. 2 shows a simplified block diagram of a CPU that can execute both RISC and CISC instructions. Instruction Pointer 34 indicates the instruction to be decoded in instruction fetch unit 32. This instruction is sent to Instruction Decode unit (ID) 36. Instruction decode 36 is composed of three sub-blocks, one for decoding CISC instructions, another for decoding RISC instructions, and a third sub-block for decoding extended RISC instructions for emulation mode. The extended instructions are at the highest privilege level, higher than even the operating systems that may be running under RISC of CISC modes. These extended instructions offer access to all the system resources, including mode register 38. Mode register 38 contains bits to indicate the current operating mode of the CPU. One bit selects between the RISC and CISC user modes, while another bit enables the extended RISC instructions for emulation mode.

Instruction decode unit 36 is a partial instruction decode unit, in that it fully decodes only about 50% of the x86 CISC instructions, and about 85% of the PowerPC RISC instructions. Several well-known implementations are possible for instruction decode unit 36. For example, random logic may be used to decode the instruction set defined by an opcode map such as Tables 2 and 3. Opcode maps in Tables 2 and 3 are similar to logic truth tables in that they fully specify the logic equations needed to decode the instruction set. Instructions that are not fully decoded are not directly supported by hardware, and signal an "unknown opcode" on line 40 to mode control block 42, which causes emulation mode to be entered.

The same opcode may map to different instructions in the two instruction sets, requiring separate decode units for each instruction set. Since emulation code runs a superset of the RISC code, additional logic to decode these extended instructions is provided with the RISC decode block. The extended emulation mode instructions are enabled by enable block 44, which is controlled by the emulation mode bit in the mode register 38. Multiplexer or Mux 46 selects the decoded instruction from either the RISC or the CISC decode sub-block. Mux 46 is controlled by the RISC/CISC mode control bit in mode register 38. When emulation mode is entered, the RISC/CISC bit must be set to the RISC setting and the emulation mode bit enabled, because RISC instructions may also be executed by the emulation code.

The decoded instruction is passed from mux 46 to execute unit 48, which can perform arithmetic functions and address generation. General-purpose registers 50 supply operands to the execute unit 48. Since a full segmentation unit is not provided, segment addition must be performed by the execute unit when needed as part of normal address generation. Limit checking is provided by hardware associated with the TLB in conjunction with the emulation driver.

Execute unit 48 is designed to execute the simpler CISC and RISC instructions, and thus has reduced complexity relative to traditional execute units on CISC and even RISC CPU's. Since only simple instructions are directly supported, the unit can be made to operate at higher speed than if all instructions were supported. Microcode can be minimized or even eliminated because complex instructions are supported by algorithms stored in emulation memory. These algorithms are not merely microcode stored off chip, which would require much more memory, but are higher-level routines composed of RISC instructions and extended instructions.

Any address generated by execute unit 48 is sent to the TLB 52, which performs an associative search on the input virtual address and translates it to a physical address output on bus 54. The page or upper address is from the TLB and the offset or lower address is bypassed around the TLB. TLB 52 can translate virtual addresses from the execute unit 48 to physical addresses if segmentation is disabled, or translate a linear address generated by addition in the address generation unit to a physical address. If the segment begins or ends on a page, then special hardware is required to specify that emulation mode should be entered if the address is close to the segment boundary, or within the physical page but outside the segment.

If the translation is not present in the TLB, a miss is signaled which causes emulation mode to be entered. Emulation mode is always used to load the TLB, allowing the emulation driver the highest level of control over address mapping and translation.

Mode control logic 42 causes emulation mode to be entered whenever a miss is signaled from TLB 52, or an unknown opcode is detected by instruction decode unit 36. Normal exceptions, interrupts, and traps from the execute unit and other units also cause emulation mode to be entered, giving great flexibility in system design. Mode control logic 42 sets and clears the RISC/CISC and emulation mode control bits in mode register 38. When entry to emulation mode is requested, entry point block 56 generates the proper entry point vector or address in the emulation portion of memory, and loads this address into the instruction pointer 34. Thus the CPU will begin fetching and executing instructions at the specified entry point, where the emulation driver contains a routine to handle the exception, TLB miss, or to emulate the unknown instruction. Instruction decode block 36 can provide the opcode itself and other fields of the instruction to the entry point logic, to allow the entry point to be more fully specified. Thus one entry point could be defined for a REP MOVS with a byte operand while another entry point is defined for a REP MOVS instruction with a long-word operand. Table 1 shows the entry points from CISC mode. For example, the REP MOVS byte instruction enters the emulation code at A4 hex, while REP MOVS longword enters at A5 hex. A TLB miss with segment 0 enters at 18 hex, while a far RETurn in x86 real mode enters at CA hex.

If the CISC user program executes an instruction to enable or disable translation and the TLB, the instruction may be detected by the instruction decode logic 36, causing an unknown instruction to be signaled over line 40 to mode control 42, causing emulation mode to be entered. Execute unit 48 may also detect an attempt to enable or disable the TLB, and signal mode control 42 by asserting TLB enable detect 49. TLB enable detect 49 does not enable or disable the TLB as is does for a prior-art CISC CPU; instead it causes emulation mode to be entered, which will emulate the effect the instruction would have had. However, the TLB is not disabled. Thus emulation mode has complete control over the TLB.

RISC Instruction Decode

The RISC sub-block of instruction decode 36 decodes the PowerPC RISC instruction set. All instructions are 32 bits in size, and some require two levels of instruction decoding. The first level determines the basic type of instruction and is encoded in the 6 most significant bits. Table 2 shows the 64 possible basic or primary opcode types. For example, 001110 binary (0E hex) is ADDI - add with an immediate operand, while 100100 (24 hex) is STW - store word. The CPU executes the 45 unshaded opcodes directly in hardware. The fifteen darkly shaded opcodes, such as 000000, are currently undefined by the PowerPC architecture. Undefined opcodes force the CPU into emulation mode, where the emulation driver executes the appropriate error routine. Should instructions later be defined for these opcodes, an emulator routine to support the functionality of the instruction could be written and added to the emulator code. Thus the CPU may be upgraded to support future enhancements to the PowerPC instruction set. It is possible that the CPU could be field-upgradable by copying into emulation memory a diskette having the new emulation routine.

The second level of instruction decoding is necessary for the remaining four lightly shaded opcodes of Table 2. Another 12-bit field in the instruction word provides the extended opcode. Thus one primary opcode could support up to 4096 extended opcodes. Primary opcode 010011, labeled "GRP A" in Table 2, contains instructions which operate on the condition code register, while groups C and D (opcodes 111011 and 111111 respectively) contain floating point operations. Group B (opcode 011111) contains an additional version of most of the primary opcode instructions, but without the displacement or immediate operand fields. Most group B and many instructions from groups A, C, and D are directly supported by the CPU's hardware, and the RISC instruction decoder thus supports some decoding of the 12-bit second level field. In the appendix is a list of the PowerPC instruction set, showing the primary and extended opcodes, and if the instruction is supported directly in hardware or emulated in emulation mode, as is, for example, opcode 2E, load multiple word.

Extended Instructions For Emulation Mode

Extended instructions for controlling the CPU's hardware are added to the RISC instruction set by using undefined opcodes, such as those indicated by the darkly shaded boxes in Table 2. Thus additional logic may be added to the RISC instruction decode unit to support these additional instructions. However, user RISC programs must not be allowed to use these extended instructions. Therefore, the decoding of these extended instructions can be disabled for RISC user mode, and only enabled for emulation mode.

Extended instructions include instructions to control the translation-lookaside buffer or TLB. The TLB may only be loaded or modified by these extended instructions which are only available when in emulation mode. Thus the emulation mode drivers have complete control over address mapping and translation in the system. This allows the emulation driver to set aside an area of memory for its own use, and to prevent user programs from accessing or modifying this area of memory. Because all memory references in user modes are routed through the TLB, which is only controllable by the emulation mode driver, the emulation mode acts as an additional layer of software between the user mode programs and operating systems, and the actual system memory and I/O. Thus the emulation driver can create an area of memory hidden from the user mode programs, and can locate its drivers and emulation routines in this hidden area of memory.

CISC Instruction Decode

CISC instructions can range in size from 8 bits (one byte) to 15 bytes. The primary x86 opcode, is decoded by the instruction decode block 36 of FIG. 2. About 50% of the x86 instructions that can be executed by Intel's 80386 CPU are executed directly by the dual-instruction set CPU. Table 3 shows a primary opcode decode map for the x86 instruction set. while Table 4 shows extended decoding. Unshaded opcodes are directly supported in hardware, such as 03 hex, ADD r,v for a long operand. This same opcode, 03 hex, corresponds to a completely different instruction in the RISC instruction set. In CISC 03 hex is an addition operation, while in RISC 03 hex is TWI -trap word immediate, a control transfer instruction. Thus two separate decode blocks are necessary for the two separate instruction sets.

A comparison of the opcode decoding of Table 2 for the RISC instruction set with Table 3 for the CISC instruction set shows that the two sets have independent encoding of instructions to opcodes. While both sets have ADD operations, the opcode number which encodes the ADD operation is different for the two instruction sets. In fact, the size and location of the opcode field in the instruction word is also different for the two instruction sets.

Darkly shaded opcodes in Table 3 are not supported directly by hardware and cause an unknown or unsupported opcode to be signaled over line 40 of FIG. 2. This causes emulation mode to be entered, and the opcode is used to select the proper entry point in the emulation memory. By careful coding of the emulation routine, performance degradation can be kept to a minimum. Lightly shaded opcodes in Table 3 are normally supported directly by the CPU, but not when preceded by a repeat prefix (opcode F2 or F3).

Selection of Instructions to Directly Support

Instructions were chosen for emulation rather than direct execution in hardware on the basis of how frequently the instruction is used in a typical x86 program, how many processor clock cycles the instruction takes, and how complex and likely the instruction is to need debugging and revision before operating properly on the dual-instruction set CPU. The performance of emulated instructions is reduced by an emulation mode entry and exit overhead, and by substituting RISC instructions for the atomic CISC instruction. Instructions that already take many clocks, such as repeated string instructions or PUSHALL, can have the entry/exit overhead amortized over more clock cycles; thus the penalty is effectively reduced. For some repeated instructions, a more complex and efficient algorithm can be coded in emulation memory, possibly even resulting in an improvement in performance.

Instructions that are very complex and poorly understood by the CPU designers can also be emulated rather than directly supported. Thus debugging could be done quickly and inexpensively by changing the emulation code in memory, rather than by the expensive and time-consuming process of revising the silicon die. Time-to-market for the CPU may therefore be reduced.

While a preferred embodiment has been described that directly decodes only about 50% of the CISC instruction set and a larger percentage of the RISC instructions set, the exact percentage of instructions decoded and supported will vary from implementation to implementation. Other embodiments may directly support a larger or a smaller percentage of a particular instruction set, while still falling within the spirit of the invention.

Translation Algorithm

When a TLB miss occurs, Mode control logic 42 of FIG. 2 sets the emulation mode bit in the mode register 38, causing emulation mode to be entered. Entry point logic 56 determines the proper entry point depending on the segment that caused the TLB miss, or if the miss was caused by an invalid or unallowed access, such as a write to a read-only page. As Table 1 shows, entry points 18–1E are defined for TLB misses for segment number 0–5, and without a segment enabled, while entry points 28–2D are for invalid accesses for segments 0–5. Entry point 48 is for instruction TLB misses.

Emulation code will determine the correct translation for the virtual address that was input into the TLB for translation. For CISC mode, segmentation rules will also be checked. The correct translation is determined by accessing the page tables for the user, if present, and accessing system page tables kept by the emulation driver in the emulation memory. The final translation will be loaded into the TLB along with the virtual address, and the translation validated and enabled. Subsequent references to the same page will result in TLB hits.

Since the TLB is only loaded by the emulation driver, and cannot be modified by the user programs or operating systems, a mechanism is provided to protect or set aside portions of memory for use solely by the emulation driver, and to partition the memory into 2 or more user spaces. The TLB must always be enabled when user mode is active, even at system reset or boot-up. The emulation driver must set up page translation tables and enable the TLB before user mode is first entered. The user mode programs must not be able to turn off or avoid TLB translation. User programs may have their own routines to set up and manage page translation tables, and the emulation driver will consult these if necessary, but will always be able to translate memory references from user modes.

Figure 3:
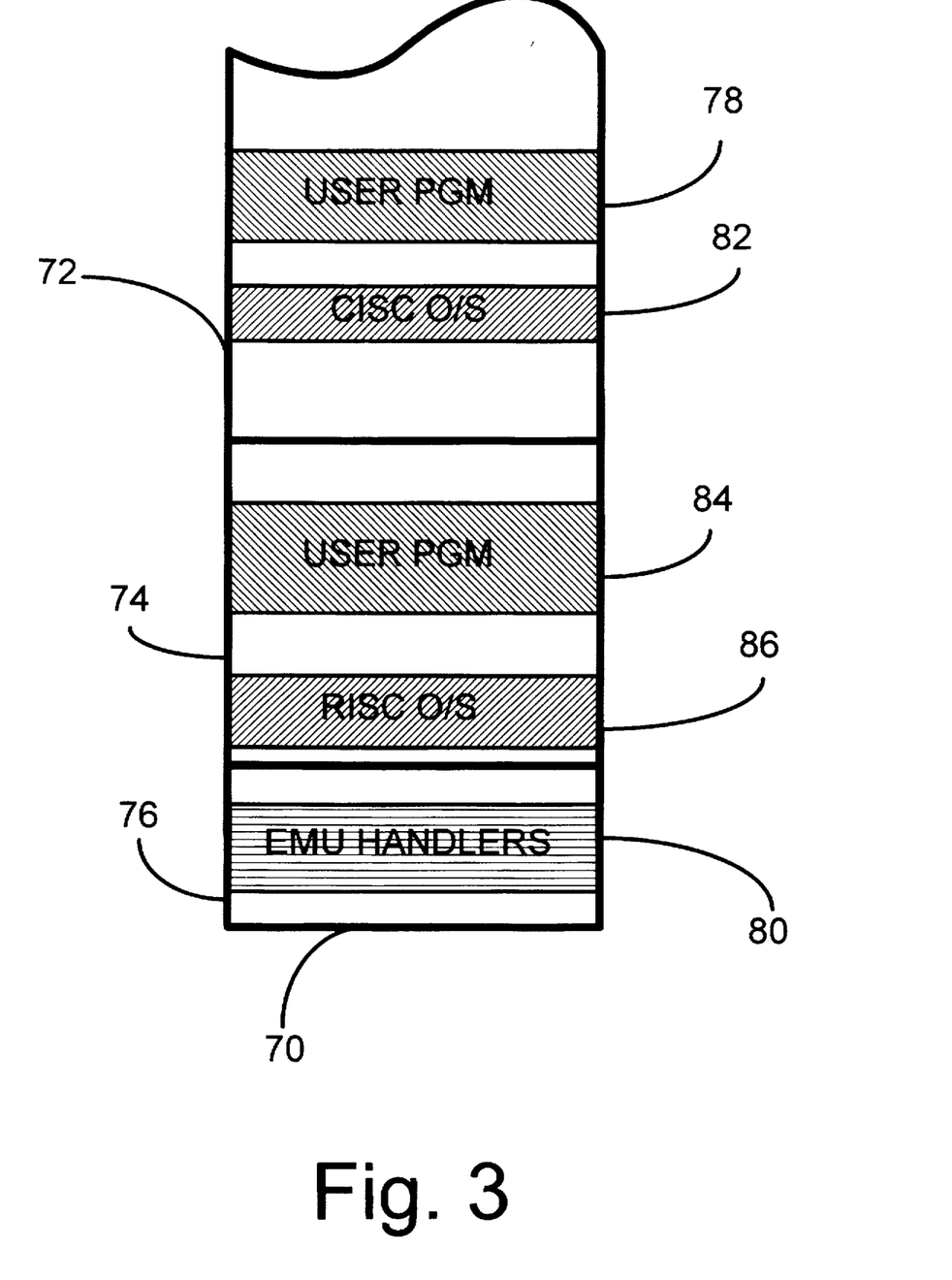
FIG. 3 shows a main memory space for use with the dual-instruction-set CPU.

FIG. 3 shows a main memory space 70 for use with the dual-instruction-set CPU. Main memory space 70 is divided into a CISC memory space 72, a RISC memory space 74, and an emulation memory space 76. Emulation memory space 76 contains handler routines 80 for emulating the more complex instructions of the RISC and CISC instruction sets that are not directly supported in the CPU's hardware. These handler routines 80 are composed of the simpler RISC instructions and extended RISC instructions, such as for controlling the TLB. The CISC memory space 72 may contain user programs 78 as well as a CISC operating system 82. Likewise the RISC memory space 74 may contain RISC user programs 84 and a RISC operating system 86. Because the emulation handler routines 80 control the TLB at the highest level, the emulation memory space 76 may be inaccessible and hidden from the user programs 78, 84, and even the operating systems 82, 86 of CISC and RISC modes. The entire memory space visible by CISC programs 78 and operating system 82 is only the CISC memory space 72.

Thus a CPU that can execute instructions from multiple instruction sets has been described. By emulating some complex instructions in software the CPU has the advantage of being simpler, less expensive to manufacture and design, and easier to debug, resulting in a faster time-to-market. The CPU may also be upgraded after being sold by a software update in the field.

Alternate Embodiments

Several other embodiments are contemplated by the inventors. For example, the RISC/CISC multiplexer 46 for the instruction decode could be implemented in a variety of ways, such as enabling the inputs to the decode logic or disabling other logic within the decoder. Many other such design choices may be made without departing from the spirit of the invention disclosed herein.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE 1

CISC Entry Points

|    | x0 | x1 | x2 | x3 | x4 | x5 | x6 | x7 | x8 | x9 | xA | xB | xC | xD | xE | xF |
|----|----|----|----|----|----|----|----|----|----|----|----|----|----|----|----|----|
| 0x | Undefined | GRP7 | LAR | LSL | CLTS | | PUSH ES | POP ES real | ZOT 0 | ZOT 1 | ZOT 2 | ZOT 3 | ZOT 4 | ZOT 5 | ZOT 6 | ZOT mult. |
| 1x | GRP6 | | | | | | PUSH SS | POP SS real | TLB miss 0 | TLB miss 1 | TLB miss 2 | TLB miss 3 | TLB miss 4 | TLB miss 5 | TLB miss none | POP DS real |
| 2x | MOV c, r | MOV d, r | MOV r, c | MOV r, d | MOV t, r | | MOV r, t | DAA | TLB inval 0 | TLB inval 1 | TLB inval 2 | TLB inval 3 | TLB inval 4 | TLB inval 5 | PUSH CS | DAS |
| 3x | | | | | | | | AAA | ZOT inst | | | | | | PUSH DS | AAS |
| 4x | reset | NMI | INTR | | | | | POP ES prot | TLB miss inst | | | | | | | |
| 5x | | | | | | | | POP SS prot | DIVG OFLO W | | | | | | | POP DS prot |
| 6x | PUSH A | POPA | BOUND | ARPL | | | | | | | | | INS | INS | OUTS | OUTS |
| 7x | | | | | | | | | | | | | | | | |
| 8x | | | | | SHLD | SHLD | | | INVD C | WBINV | RSM | | SHRD | SHRD | | |
| 9x | | | | | LFS real | LGS real | LFS prot | LGS prot | | | Call far real | Call far prot | PUSH F 16bit | POPF 16bit | PUSH F 32bit | POP F 32bit |
| Ax | PUSH FS | POP FS real | | | Movs byte REP | Movs long REP | Cmps byte REP | Cmps long REP | PUSH GS | POP GS real | Stos byte REP | Stos long REP | Lods byte REP | Lods long REP | Scas byte REP | Scas long REP |
| Bx | | POP FS prot | LSS real | LSS prot | Movs byte repne | Movs long repne | Cmps byte repne | Cmps long repne | | POP GS prot | Stos byte repne | Stos long repne | Lods byte repne | Lods long repne | Scas byte repne | Scas long repne |
| Cx | XADD | XADD | | | LES real | LDS real | LES prot | LDS prot | Enter | Leave | RET far real | RET far read | INT3 real | INTn real | INTO real | IRET real |
| Dx | | | | | AAM | AAD | | XLAT | | | RET far prot | RET far prot | INT3 prot | INTn prot | INTO prot | IRET prot |
| Ex | | | | | IN | IN | OUT | OUT | | | JMP far real | JMP far prot | IN | IN | OUT | OUT |
| Fx | | | | | HLT | | CMP XCHG | CMP XCHG | | | CLI | STI | BSF | BSR | | all other invals |

TABLE 2

PowerPC RISC Opcodes 50

| PowerPC primary opcode | XXX000 | XXX001 | XXX010 | XXX011 | XXX100 | XXX101 | XXX110 | XXX111 |
|---|---|---|---|---|---|---|---|---|
| 000XXX | | | | TWI | | | | MULI |
| 001XXX | | SUBFIC | | CMPLI 55 | CMPI | ADDIC | ADDIC. | ADDIS |
| 010XXX | | BCx | SC | Bx | GRP A Condition register instructions | RLWIMIx | RLWINMx | ADDI. | RLWNMx |
| 011XXX | | ORI | ORIS | XORI 60 | XORIS | ANDI. | ANDIS. | | GRP B Misc. Instructions |
| 100XXX | | LWZ | LWZU | LBZ | LBZU | STW | STWU | STB | STBU |
| 101XXX | | LHZ | LHZU | LHA | LHAU | STH | STHU | LMW | STMW |
| 1100XXX | | LFS | LFSU | LFD | LFDU | STFS | STFSU | STFD | STFDU |
| 111XXX | | | | 65 | GRP C FP operate | | | | GRP D FP operate |

TABLE 3 x86 CISC Opcode Map

| OP | x0 | x1 | x2 | x3 | x4 | x5 | x6 | x7 | x8 | x9 | xA | xB | xC | xD | xE | xF |
|---|---|---|---|---|---|---|---|---|---|---|---|---|---|---|---|---|
| 0x | ADD v,r byte | ADD v,r long | ADD r,v byte | ADD r,v long | ADD AL,I | ADD AX,i | PUSH ES | POP ES | OR v,r byte | OR v,r long | OR r,v byte | OR r,v long | OR AL,i | OR AX,i | PUSH CS | 2nd Page |
| 1x | ADC v,r byte | ADC v,r long | ADC r,v byte | ADC r,v long | ADC AL,I | ADC AX,i | PUSH SS | POP SS | SBB v,r byte | SBB v,r long | SBB r,v byte | SBB r,v long | SBB AL,i | SBB AX,i | PUSH DS | POP DS |
| 2x | AND v,r byte | AND v,r long | AND r,v byte | AND r,v long | AND AL,I | AND AX,i | SEG ES | DAA | SUB v,r byte | SUB v,r long | SUB r,v byte | SUB r,v long | SUB AL,i | SUB AX,i | SEG CS | DAS |
| 3x | XOR v,r byte | XOR v,r long | XOR r,v byte | XOR r,v long | XOR AL,I | XOR AX,i | SEG SS | AAA | CMP v,r byte | CMP v,r long | CMP r,v byte | CMP r,v long | CMP AL,i | CMP AX,i | SEG DS | AAS |
| 4x | INC AX | INC CX | INC DX | INC BX | INC SP | INC BP | INC SI | INC DI | DEC AX | DEC CX | DEC DX | DEC BX | DEC SP | DEC BP | DEC SI | DEC DI |
| 5x | PUSH AX | PUSH CX | PUSH DX | PUSH BX | PUSH SP | PUSH BP | PUSH SI | PUSH DI | POP AX | POP CX | POP DX | POP BX | POP SP | POP BP | POP SI | POP DI |
| 6x | PUSHA | POPA | BOUND | ARPL | SEG FS | SEG GGS | SIZE OP | SIZE ADR | PUSH long | IMUL long | PUSH byte | IMUL byte | INS | INS | OUTS | OUTS |
| 7x | JO | JNO | JB | JNB | JZ | JNZ | JBE | JNBE | JS | JNS | JP | JNP | JL | JNL | JLE | JNLF |
| 8x | ALU v,i byte | ALU v,i long | ALU 16bit | ALU v,i sign-ext | TEST v,r byte | TEST v,r long | Xchg v,r byte | Xchg v,r long | MOV v,r byte | MOV v,r long | MOV r,v byte | MOV r,v long | MOV v,s 16bit | LEA | MOV s,v 16bit | POP v |
| 9x | NOP | Xchg CX | Xchg DX | Xchg BX | Xchg SP | Xchg BP | Xchg SI | Xchg DI | CBW | CWD | Call | WAIT | PUSHF | POPF | SAHF | SAHF |
| Ax | MOV AL,m | MOV AX,m | MOV m,AL | MOV m,AX | Movs byte | Movs long | Cmps byte | Cmps long | TEST AL,i | TEST AX,i | Stos byte | Stos long | Lods byte | Lods long | Scas byte | Scas long |
| Bx | MOV AL,i | MOV CL,i | MOV DL,i | MOV BL,i | MOV AH,i | MOV CH,i | MOV DH,i | MOV BH,i | MOV AX,i | MOV CX,i | MOV DX,i | MOV BX,i | MOV SP,i | MOV BP,i | MOV SI,i | MOV DI,i |
| Cx | SHFT v,i byte | SHFT v,i long | RET 16bit | RET | LES | IDS | MOV v,i byte | MOV v,i long | Enter | Leave | RET | RET | INT3 | INTn | INTO | IRET |
| Dx | SHFT v,1 byte | SHFT v,1 long | SHFT v,CL byte | SHFT v,CL long | AAM | AAD | | XLAT | FP | FP | FP | FP | FP | FP | FP | FP |
| Ex | Loop NE | Loop E | Loop byte | JCXZ long | IN | IN | OUT | OUT | Call long | JMP long | JMP | JMP byte | IN | IN | OUT | OUT |
| Fx | Lock | REP NE | REP | REP | HLT | CMC | ALU2 v byte | ALU2 v long | CLC | STC | CLI | STI | CLD | CLD | GRP4 | GRP5 |

TABLE 4 x86 CISC Secondary Opcode Map

| 2nd | x0 | x1 | x2 | x3 | x4 | x5 | x6 | x7 | x8 | x9 | xA | xB | xC | xD | xE | xF |
|---|---|---|---|---|---|---|---|---|---|---|---|---|---|---|---|---|
| 0x | GRP6 | GRP7 | LAR | LSL | | | CLTS | Load ALL | INV DC | WB INV | | | | | | |
| 1x | ICE | ICE | ICE | ICE | | | | | | | | | | | | |
| 2x | MOV c, r | MOV d, r | MOV t, c | MOV r, d | MOV t, r | | MOV r, t | | | | | | | | | |
| 3x | | | | | | | | | | | | | | | | |
| 4x | | | | | | | | | | | | | | | | |
| 5x | | | | | | | | | | | | | | | | |
| 6x | | | | | | | | | | | | | | | | |
| 7x | | | | | | | | | | | | | | | | |
| 8x 9x | JO SET O | JNO SET NO | JB SET B | JNB SET NB | JZ SET Z | JNZ SET ZN | JBE SET BBE | JNBE SET NBE | JS SET S | JNS SET NS | JP SET P | JNP SET NP | JL SET L | JNL SET NL | JLE SET LE | JNLE SET NLE |
| Ax | PUSH FS | POP FS | | BT v, r | SHLD | SHLD | CMP XCHG | CMP XCHG | PUSH GS | POP GS | RSM | BTS v, r | BHRD | SHRD | | IMUL r, v |
| Bx | | | LSS | BTR v, r | LFS | LGS | MOV ZX r, v byte | MOV ZX r, v long | | BIT | BTC TEST v, i | BSF v, r | BSR | MOV | MOV SX r, v byte | SX r, v long |
| Cx | XADD | XADD | | | | | | | bswap AX | bswap CX | bswap DX | bswap BX | bswap SP | bswap BP | bswap SI | bswap DI |
| Dx | | | | | | | | | | | | | | | | |
| Ex | | | | | | | | | | | | | | | | |
| Fx | | | | | | | | | | | | | | | | |

Appendix: PowerPC RISC Instruction Set

| Primary opcode | Extend. opcode | Mnemnic | Instruction | How handled | Units |
|---|---|---|---|---|---|
| 20 | | lwz | Load word and zero | Hardware | IU0 |
| 21 | | lwzu | update | | IU01 |
| 1F | 17 | lwzx | indexed | | IU0 |
| 1F | 37 | lwzux | indexed update | | IU01 |
| 24 | | stw | Store word | Hardware | IU0 |
| 25 | | stwu | update | | IU01 |
| 1F | 97 | stwx | indexed | | IU0 |
| 1F | B7 | stwux | indexed update | | IU01 |
| 28 | | lhz | Load halfword and zero | Hardware | IU0 |
| 29 | | lhzu | update | | IU01 |
| 1F | 117 | lhzx | indexed | | IU0 |
| 1F | 137 | lhzux | indexed update | | IU01 |
| 2A | | lha | Load halfword algebraic | | IU0 |
| 2B | | lhau | update | | IU01 |
| 1F | 157 | lhax | indexed | | IU0 |
| 1F | 177 | lhaux | indexed update | | IU01 |
| 2C | | sth | Store halfword | Hardware | IU0 |
| 2D | | sthu | update | | IU01 |
| 1F | 197 | sthx | indexed | | IU0 |
| 1F | 1B7 | sthux | indexed update | | IU01 |
| 22 | | lbz | Load byte and zero | Hardware | IU0 |
| 23 | | lbzu | update | | IU01 |
| 1F | 57 | lbzx | indexed | | IU0 |
| 1F | 77 | lbzux | indexed update | | IU01 |
| 26 | | stb | Store byte | Hardware | IU0 |
| 27 | | stbu | update | | IU01 |
| 1F | D7 | stbx | indexed | | IU0 |
| 1F | F7 | stbux | indexed update | | IU01 |
| 30 | | lfs | Load F.P. single precision | Hardware | IU0 |
| 31 | | lfsu | update | | IU01 |
| 1F | 217 | lfsx | indexed | | IU0 |
| 1F | 237 | lfsux | indexed update | | IU01 |
| 32 | | lfd | Load F.P. double precision | Hardware | IU0 |
| 33 | | lfdu | update | | IU01 |
| 1F | 257 | lfdx | indexed | | IU0 |
| 1F | 277 | lfdux | indexed update | | IU01 |
| 34 | | stfs | Store F.P. single precision | Hardware | IU0 |
| 35 | | stfsu | update | | IU01 |

-continued

Appendix: PowerPC RISC Instruction Set

| Primary opcode | Extend. opcode | Mnemnic | Instruction | How handled | Units |
|---|---|---|---|---|---|
| 1F | 297 | stfsx | indexed | | IU0 |
| 1F | 2B7 | stfsux | indexed update | | IU01 |
| 36 | | stfd | Store F.P. double | Hardware | IU0 |
| 37 | | stfdu | precision | | IU01 |
| 1F | 2D7 | stfdx | update | | IU0 |
| 1F | 2F7 | stfdux | indexed indexed update | | IU01 |
| 2E | | lmw | Load multiple word | Emulate | IU01 & BU |
| 2F | | stmw | Store multiple word | Emulate | IU01 & BU |
| 1F | 216 | lwbrx | Load word byte-reverse indexed | Hardware | IU0 |
| 1F | 296 | stwbrx | Store word byte-reverse indexed | Hardware | IU0 |
| 1F | 316 | lhbrx | Load halfword byte-reverse indexed | Hardware | IU0 |
| 1F | 396 | sthbrx | Store halfword byte-reverse indexed | Hardware | IU0 |
| 1F | 14 | lwarx | Load word and reserve indexed | | IU0 |
| 1F | 96 | stwcx. | Store word conditional indexed | | IU0 |

Logical and Shift Instructions

| Primary opcode | Extend. opcode | Mnemnic | IF | How handled | Units |
|---|---|---|---|---|---|
| 1F | 1C | andx | AND | Hardware | IU1 |
| 1C | | andi. | | | |
| 1D | | andis. | | | |
| 1F | 3C | andcx | AND with complement | Hardware | IU1 |
| 1F | 7C | norx | NOR | Hardware | IU1 |
| 1F | 11C | eqvx | Equivalent | Hardware | IU1 |
| 1F | 13C | xorx | XOR | Hardware | IU1 |
| 1A | | xori | | | |
| 1B | | xoris | | | |
| 1F | 19C | orcx | OR with complement | Hardware | IU1 |
| 1F | 1BC | orx | OR | Hardware | IU1 |
| 18 | | ori | | | |
| 19 | | oris | | | |
| 1F | 1DC | nandx | NAND | Hardware | IU1 |
| 14 | | rlwimix | Rotate left word immed. then AND with mask insert | Hardware | IU1 |
| 15 | | rlwinmx | Rotate left word immed. then AND with mask | Hardware | IU1 |
| 17 | | rlwnmx | Rotate left word then AND with mask | Hardware | IU1 |
| 1F | 18 | slwx | Shift left word | Hardware | IU1 |
| 1F | 218 | srwx | Shift right word | Hardware | IU1 |
| 1F | 318 | srawx | Shift right algebraic word | Hardware | IU1 |
| 1F | 338 | srawix | Shift right algebraic word immediate | Hardware | IU1 |
| 1F | 1A | cntlzwx | Count leading zeros word | Hardware | IU1 |
| 1F | 39A | extshx | Extend sign halfword | Hardware | IU1 |
| 1F | 3BA | extsbx | Extend sign byte | Hardware | IU1 |

Algebraic instructions

| Primary opcode | Extend. opcode | Mnemnic | Instruction | How handled | Units |
|---|---|---|---|---|---|
| E | | addi. | ADD immediate | Hardware | IU1 |
| C | | addic | carrying | | |
| D | | addic. | carrying record | | |
| F | | addis | shifted | | |
| 1F | 10A | addx | ADD | Hardware | IU1 |
| 1F | A | addcx | carrying | | |
| 1F | 8A | addex | extended | | |
| 1F | CA | addmex | to minus one extended | | |
| 1F | EA | addzex | to zero extended | | |
| 8 | | subfic | SUB immediate carrying | Hardware | IU1 |
| 1F | 28 | subfx | SUB | Hardware | IU1 |
| 1F | 8 | subfcx | carrying | | |
| 1F | 88 | subfex | extended | | |
| 1F | E8 | subfmex | to minus one extended | | |
| 1F | C8 | subfzex | to zero extended | | |
| 1F | 68 | negx | Negate | Hardware | IU1 |

-continued

| Appendix: PowerPC RISC Instruction Set | | | | | |
|---|---|---|---|---|---|
| B | | cmpi | Compare immediate | Hardware | IU1 |
| A | | cmpli | logical | | |
| 1F | 0 | cmp | Compare | Hardware | IU1 |
| 1F | 20 | cmpl | logical | | |
| | | | Control transfer instructions | | |
| 12 | | bx | Branch | Hardware | BU |
| 10 | | bcx | Branch conditional | Hardware | BU |
| 1F | 4 | tw | Trap word | Hardware | IU1 |
| 3 | | twi | immediate | | |
| 13 | 10 | bcctrx | Branch cond. to count reg. | Hardware | BU |
| 13 | 210 | bclrx | Branch cond. to link reg. | Hardware | BU |
| 11 | 1 | | System call | Hardware | BU |
| | | | Multiply and Divide instructions | | |
| 1F | EB | mullx | Multiply low | Hardware | IU01 |
| 7 | | mulli | immediate | | |
| 1F | 4B | mulhwx | Multiply high | Hardware | IU01 |
| 1F | B | mulhwux | unsigned | | |
| 1F | 1CB | divwx | Divide word | Hardware | IU01 |
| 1F | 1EB | divwux | unsigned | | |
| | | | String instructions | | |
| 1F | 215 | lswx | Load string word indexed | Emulated | IU01 & BU |
| 1F | 255 | lswi | Load string word immediate | Emulated | IU01 & BU |
| 1F | 295 | stswx | Store string word indexed | Emulated | IU01 & BU |
| 1F | 2D5 | stswi | Store string word immediate | Emulated | IU01 & BU |
| | | | Condition register instructions | | |
| 13 | 0 | mcrf | Move CR field | Hardware | BU |
| 13 | 21 | crnor | CR NOR | Hardware | BU |
| 13 | 81 | crandc | CR AND with complement | Hardware | BU |
| 13 | C1 | crxor | CR XOR | Hardware | BU |
| 13 | E1 | crnand | CR NAND | Hardware | BU |
| 13 | 101 | crand | CR AND | Hardware | BU |
| 13 | 121 | creqv | CR Equivalent | Hardware | BU |
| 13 | 1A1 | crorc | CR OR with complement | Hardware | BU |
| 13 | 1C1 | cror | CR OR | Hardware | BU |
| 1F | 90 | mtcrf | Move to CR fields | Hardware | IU1 & BU |
| 1F | 200 | mcrxr | Move to CR from XER | Hardware | BU |
| 3F | 40 | mcrfs | Move to CR from FPSCR | Hardware | BU |
| 1F | 13 | mfcr | Move from CR field | Hardware | IU1 & BU |
| 3F | 26 | mtfsb1x | Move to FPSCR bit 1 | Hardware | BU |
| 3F | 46 | mtfsb0x | Move to FPSCR bit 0 | Hardware | BU |
| 3F | 86 | mtfsfix | Move to FPSCR immediate | Hardware | BU |
| 3F | 247 | mffsx | Move from FPSCR | Hardware | FU & BU |
| 3F | 2C7 | mtfsfx | Move to FPSCR | Hardware | FU & BU |
| | | | Privileged instructions | | |
| 13 | 32 | rfi | Return from interrupt | Emulated | IU01 & BU |
| 13 | 96 | isync | Instruction synchronize | Emulated | IU01 & BU |
| 1F | D2 | mtsr | Move to segment register indirect | Emulated | IU01 BU |
| 1F | F2 | mtsrin | | | |
| 1F | 253 | mfsr | Move from segment register indirect | Emulated | IU01 & BU |
| 1F | 293 | mfsrin | | | |
| 1F | 53 | mfmsr | Move from machine state register | Emulated | IU01 & BU |
| 1F | 92 | mtmsr | Move to machine state register | Emulated | IU01 & BU |
| 1F | 132 | tlbie | TLB invalidate entry | Emulated | IU01 & BU |
| 1F | 1F2 | slbia | SLB invalidate all | not impl. | IU01 & BU |
| 1F | 1B2 | slbia | SLB invalidate entry | not impl. | IU01 & BU |
| 1F | 1D2 | slbiex | SLB invalidate by index | not impl. | IU01 & BU |

| | | | Appendix: PowerPC RISC Instruction Set | | |
|---|---|---|---|---|---|
| 1F | 113 | mflb | Move from time base | not impl. | IU01 & BU |
| 1F | 133 | mftbu | Move from time base upper | not impl. | IU01 & BU |
| 1F | 193 | mttb | Move to time base | not impl. | IU01 & BU |
| 1F | 1B3 | mttbu | Move to time base upper | not impl. | IU01 & BU |
| 1F | 153 | mfspr | Move from special purpose register | Emulated | IU01 & BU |
| 1F | 1D3 | mtspr | Move to special purpose register | Emulated | IU01 & BU |
| | | | | Emulated | IU01 & BU |
| | | | | Emulated | IU01 & BU |
| | | | Other user-mode instructions | | |
| 1F | 36 | dcbst | Data cache block store | Emulated | IU01 & BU |
| 1F | 56 | dcbf | Data cache block flush | Emulated | IU01 & BU |
| 1F | F6 | dcbtst | Data cache block touch for store | Emulated | IU01 & BU |
| 1F | 116 | dcbt | Data cache block touch | Emulated | IU01 & BU |
| 1F | 1D6 | dcbi | Data cache block invalidate | Emulated | IU01 & BU |
| 1F | 3F6 | dcbz | Data cache block zero | Emulated | IU01 & BU |
| 1F | 3D6 | icbi | Instruction cache block invalidate | Emulated | IU01 & BU |
| 1F | 356 | eieio | Enforce in-order I/O execution | Emulated | IU01 & BU |
| 1F | 256 | sync | Synchronize | Emulated | IU01 & BU |
| 1F | 136 | eciwx | External control input word indexed | Emulated | IU01 & BU |
| 1F | 1B6 | ecowx | External control output word indexed | Emulated | IU01 & BU |
| | | | Other instructions | | |
| 1F | 73 | mfpmr | Move from program mode register | | |
| 1F | B2 | mtpmr | Move to program mode register | | |
| | | | Floating point instructions | | |
| 3B | 12 | fdivsx | FP SP Divide | Hardware | FU |
| 3B | 14 | fsubsx | FP SP Subtract | Hardware | FU |
| 3B | 15 | faddsx | FP SP Add | Hardware | FU |
| 3B | 16 | frsqrtsx | FP SP Square root | not impl. | IU01 & BU |
| 3B | 19 | fmulsx | FP SP Multiply | Hardware | FU |
| 3B | 1C | fmsubsx | FP SP Multiply-Subtract | Hardware | FU |
| 3B | 1D | fmaddsx | FP SP Multiply-Add | Hardware | FU |
| 3B | 1E | fnmsubsx | FP SP Neg-Mult-Subtract | Hardware | FU |
| 3B | 1F | fnmaddsx | FP SP Net-Mult-Add | Hardware | FU |
| 3F | 12 | fdivx | FP DP Divide | Hardware | FU |
| 3F | 14 | fsubx | FP DP Subtract | Hardware | FU |
| 3F | 15 | faddx | FP DP Add | Hardware | FU |
| 3F | 16 | fsqrtx | FP DP Square root | not impl. | IU01 & BU |
| 3F | 19 | fmulx | FP DP Multiply | Hardware | FU |
| 3F | 1C | fmsubx | FP DP Multiply-Subtract | Hardware | FU |
| 3F | 1D | fmaddx | FP DP Multiply-Add | Hardware | FU |
| 3F | 1E | fnmsubx | FP DP Neg-Mult-Subtract | Hardware | FU |
| 3F | 1F | fnmaddx | FP DP Net-Mult-Add | Hardware | FU |
| 3B | 18 | fresx | FP SP Reciprocal estimate | not impl. | IU01 & BU |
| 3F | 0 | fcmpu | FP Compare unordered | Hardware | FU |
| 3F | C | frspx | FP Round to SP | Hardware | FU |
| 3F | E | fctiwx | FP Convert to integer word | Hardware | FU |
| 3F | F | fctiwzx | FP Convert to integer word and round toward zero | Hardware | FU |

-continued

| Appendix: PowerPC RISC Instruction Set | | | | | |
|---|---|---|---|---|---|
| 3F | 17 | fselx | FP Select | not impl. | IU01 & BU |
| 3F | 1A | frsqrtex | FP Reciprocal square root estimate | not impl. | IU01 & BU |
| 3F | 20 | fcmpo | FP Compare ordered | Hardware | FU |
| 3F | 28 | fnegx | FP Negate | Hardware | FU |
| 3F | 48 | fmrx | FP Move register | Hardware | FU |
| 3F | 108 | fnabsx | FP Negative absolute value | Hardware | FU |
| 3F | 147 | fabsx | FP Absolute value | Hardware | FU |

We claim:

1. A central processing unit (CPU) for processing instructions from two separate instruction sets, said CPU comprising:

first instruction decode means for decoding instructions from a first instruction set, said first instruction set having a first encoding of instructions;

second instruction decode means for decoding only a subset of instructions from a second instruction set, said second instruction set having a second encoding of instructions, said first encoding of instructions independent from said second encoding of instructions;

select means, coupled to said first instruction decode means and said second instruction decode means, for selecting said decoded instruction from either said first instruction decode means or from said second instruction decode means; and execute means for executing decoded instructions selected by said select means, whereby instructions from both said first instruction set and said second instruction set are executed by said CPU.

2. The CPU of claim 1 further comprising:

an instruction fetch buffer, containing instructions to be decoded, coupled to said first instruction decode means and said second instruction decode means; and instruction pointer means, coupled to said instruction fetch buffer, for indicating an address of a next instruction to be decoded.

3. The CPU of claim 1 further comprising:

mode register means, coupled to said select means, for indicating an instruction set to be decoded and executed.

4. The CPU of claim 3 further comprising:

mode control means, coupled to said mode register means, for changing said instruction set to be decoded.

5. The CPU of claim 4 wherein the second instruction decode means decodes only a portion of said second instruction set, and said second instruction decode means indicating to said mode control means when an instruction is not in said decoded portion of said second instruction set;

the mode control means changing said instruction set to be decoded to said first instruction set when an indication is received that an instruction is not in said decoded portion of said second instruction set.

6. The CPU of claim 5 further comprising a translation-lookaside buffer (TLB) coupled to said execute means, said TLB having address translation entries for translating a virtual address from said execute means to a physical address for accessing a main memory, said TLB providing an indication to aid mode control means to change said instruction set to be decoded to said first instruction set when no translation is found in said TLB corresponding to aid virtual address from said execute means.

7. The CPU of claim 6 wherein a handler routine comprised of instructions from said first instruction set is fetched from main memory and executed when mode control is signaled by said TLB or by said second instruction decode means.

8. The CPU of claim 7 wherein said execute unit provides an indication to said mode control means when an exception occurs in said execute unit, said mode control means changing aid instruction set to be decoded to said first instruction set when said indication is received.

9. The CPU of claim 6 wherein all references to main memory generated by instructions in said second instruction set are translated by said TLB.

10. The CPU of claim 6 wherein said address translation entries in said TLB are loaded only by instructions decoded by said first instruction decode means.

11. The CPU of claim 10 wherein said first instruction decode means decodes instructions from said first instruction set and extended instructions added to said first instruction set, and wherein said address translation entries in said TLB are modified only by said extended instructions.

12. The CPU of claim 11 wherein said first instruction decode means is selected to decode instructions immediately following a reset of said CPU.

13. The CPU of claim 11 wherein said extended instructions are decoded by said first instruction decode means only when said mode control means is signaled to change said instruction set to be decoded or immediately following a reset.

14. A method for processing instructions from two separate instruction sets on a central processing unit (CPU), said method comprising:

decoding instructions from a first instruction set with a first instruction decoder, said first instruction set having a first encoding of instructions;

decoding only a subset of instructions from a second instruction set with a second instruction decoder, said second instruction set having a second encoding of instructions, said first encoding of instructions independent from said second encoding of instructions;

selecting said decoded instruction from either said first instruction decoder or from said second instruction decoder; and executing said decoded instruction that was selected, whereby instructions from both said first instruction set and said second instruction set are executed by said CPU.

15. A method for processing instructions from a complex instruction set computer (CISC) instruction set on a reduced instruction set computer (RISC) Central Processing Unit (CPU), said method comprising:

attempting to decode an instruction with a CISC instruction decode unit that does not decode all instructions in said CISC instruction set;

directly executing said instruction in an execute unit if said CISC instruction decode unit is able to decode said instruction;

entering an emulation mode if said CISC instruction decode unit is not able to fully decode said instruction, indicating that said execute unit cannot directly execute said instruction;

disabling said CISC instruction decode unit and enabling a RISC instruction decode unit when entering emulation mode;

loading an instruction pointer with an address of a software emulation routine for emulating said undecodable instruction, said routine comprising instructions from a separate RISC instruction set;

decoding RISC instructions with said RISC instruction decode unit as aid software routine is executed;

executing said RISC instructions in said execute unit; and exiting emulation mode, disabling said RISC instruction decode unit and enabling said CISC instruction decode unit when said end of said software emulation routine is reached, whereby all instructions from said CISC instruction set are executed, either directly by said execute unit or by emulation with a software emulation routine comprised of RISC instructions.

16. The method of claim 15 wherein the software emulation routine is comprised of RISC instructions and extended instructions, said extended instructions using undefined opcodes in said RISC instruction set;

the method further comprising decoding and executing extended instructions while said software emulation routine is being executed.

17. The method of claim 16 further comprising:

translating memory references generated by said CISC instructions that are directly executed, said translation of memory references controlled by a software translator routine comprised of RISC instructions and extended instructions, said translator routine loading said resulting translations into a translation-lookaside buffer.

18. A microprocessor for executing instructions belonging to a reduced instruction set computer (RISC) instruction set and for executing instructions belonging to a complex instruction set computer (CISC) instruction set, said microprocessor comprising:

RISC instruction decode means, for decoding instructions belonging to said RISC instruction set;

CISC instruction decode means, for decoding only a subset of instructions belonging to said CISC instruction set;

mode register means for indicating a current operating mode of said microprocessor;

enable means, coupled to said RISC instruction decode means and said CISC instruction decode means, for enabling said-decoding of instructions belonging to said RISC instruction set or belonging to said CISC instruction set, said enable means responsive to said current operating mode of said microprocessor; and an execution unit, coupled to said RISC instruction decode means and said CISC instruction decode means, for executing instructions belonging to said RISC instruction set and instructions belonging to said CISC instruction set, whereby instructions from said RISC instruction set and instructions from said CISC instruction set can be executed by said execution unit.

19. The microprocessor of claim 18 wherein said mode register means indicates CISC mode, RISC mode, or an emulation mode, wherein a portion of said CISC instruction set is decoded by said CISC instruction decode means when said mode register means indicates CISC mode, and wherein undecoded CISC instructions are emulated by emulation mode.

20. The microprocessor of claim 19 wherein emulation mode is entered when said CISC instruction decode means signals an undecoded instruction, said mode register means changing from CISC mode to emulation mode when an undecoded instruction is signaled.

* * * * *